(12) United States Patent
Yang et al.

(10) Patent No.: US 11,200,694 B2
(45) Date of Patent: Dec. 14, 2021

(54) APPARATUS AND METHOD FOR EXTRACTING OBJECT INFORMATION

(71) Applicant: SAMSUNG SDS CO., LTD., Seoul (KR)

(72) Inventors: Hee-Sung Yang, Seoul (KR); Seong-Ho Jo, Seoul (KR); Joong-Bae Jeon, Seoul (KR); Do-Young Park, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 178 days.

(21) Appl. No.: 16/665,575

(22) Filed: Oct. 28, 2019

(65) Prior Publication Data

US 2020/0134858 A1     Apr. 30, 2020

(30) Foreign Application Priority Data

Oct. 29, 2018 (KR) .......................... 10-2018-0130146

(51) Int. Cl.
   *G06T 7/73*     (2017.01)
   *G06K 9/46*    (2006.01)
   *G06T 7/00*     (2017.01)

(52) U.S. Cl.
   CPC .............. *G06T 7/73* (2017.01); *G06K 9/4642* (2013.01); *G06T 7/0002* (2013.01); *G06T 2207/30108* (2013.01)

(58) Field of Classification Search
   CPC .................... G06T 7/73; G06T 7/0002; G06T 2207/30108; G06T 2207/20084; G06T 7/0004; G06T 7/11; G06T 7/60; G06T 7/70; G06K 9/4642; G06K 9/3233; G06K 9/38; G06K 9/6267
   See application file for complete search history.

(56) References Cited

U.S. PATENT DOCUMENTS

| | | | |
|---|---|---|---|
| 6,578,017 B1 * | 6/2003 | Ebersole | ..... G06T 7/00 706/3 |
| 9,165,369 B1 * | 10/2015 | Zhang | ..... G06K 9/628 |
| 2002/0051007 A1 * | 5/2002 | Kitagawa | ..... H04N 19/80 345/660 |
| 2003/0194124 A1 * | 10/2003 | Suzuki | ..... G06T 7/0012 382/156 |
| 2005/0157939 A1 * | 7/2005 | Arsenault | ..... G06T 5/002 382/260 |

(Continued)

FOREIGN PATENT DOCUMENTS

KR    10-2012-0064581 A    6/2012

*Primary Examiner* — Xuemei G Chen
(74) *Attorney, Agent, or Firm* — The PL Law Group, PLLC (57) ABSTRACT

An apparatus for extracting object information according to one embodiment includes: a padding image generator for generating a padding image including an original image; a partial image acquirer for acquiring a plurality of partial images of the padding image; an object classification result acquirer for acquiring an object classification result for each of the plurality of partial images using an object classification model; a confidence map generator for generating a confidence map having a size the same as that of the padding image and including a confidence value on the basis of the object classification result; and an object information acquirer for acquiring information on an object in the padding image on the basis of the confidence map.

16 Claims, 11 Drawing Sheets

(56) References Cited

U.S. PATENT DOCUMENTS

| | | | |
|---|---|---|---|
| 2005/0271254 A1* | 12/2005 | Hougen | G06K 9/00651 |
| | | | 382/104 |
| 2006/0257031 A1* | 11/2006 | Abramoff | G06T 7/0012 |
| | | | 382/224 |
| 2013/0108122 A1* | 5/2013 | Ptucha | H04N 5/2355 |
| | | | 382/118 |
| 2018/0188037 A1* | 7/2018 | Wheeler | H04L 67/10 |
| 2018/0249164 A1* | 8/2018 | Kim | H04N 19/174 |
| 2019/0205735 A1* | 7/2019 | Smelyanskiy | G06F 17/16 |
| 2020/0013154 A1* | 1/2020 | Jang | G06T 5/50 |
| 2020/0034951 A1* | 1/2020 | Zhu | G06T 5/002 |
| 2021/0082082 A1* | 3/2021 | Zhao | G06T 1/60 |

\* cited by examiner

APPARATUS AND METHOD FOR EXTRACTING OBJECT INFORMATION

CROSS-REFERENCE TO RELATED APPLICATION(S)

This application claims the benefit under 35 USC § 119(a) of Korean Patent Application No. 10-2018-0130146, filed on Oct. 29, 2018, in the Korean Intellectual Property Office, the entire disclosure of which is incorporated herein by reference for all purposes.

BACKGROUND

1. Field

The disclosed embodiments relate to a technique of extracting object information on an object included in an image.

2. Description of Related Art

In a system equipped with an automation facility, photographing images of a product at a correct position is very important as it is connected to performance of classifying defects of the product and stability of the system. Accordingly, when product images may not be taken at a correct position due to the problems of automation facility line, camera or like, the automation facility system may not correctly classify defects of products, and a problem of the system itself may occur in the end.

Meanwhile, conventional techniques detect defects of a product using a deep learning model related to image processing. For example, as conventional deep learning models related to image processing, there are an image classification model, an object detection model and an object segmentation model. At this point, the image classification model has good performance in classifying objects contained in an image, but has a problem in that the position of an object cannot be detected. Although the object detection and segmentation models may detect the position of an object included in an image, performance of classifying the object is poor. In addition, since the object detection and segmentation models use a data including position information as a learning data, there is a problem in that a lot of time and cost are consumed.

Therefore, requested is a method which can classify defects contained in an image of a product and enhance the performance of extracting positions of the classified defects in a system equipped with an automation facility.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended providing an apparatus and method for extracting object information.

In one general aspect, there is provided an apparatus for extracting object information includes at least one hardware processor configured to implement: a padding image generator configured to generate a padding image including an original image; a partial image acquirer configured to acquire a plurality of partial images of the padding image; an object classification result acquirer configured to acquire an object classification result for each of the plurality of partial images using an object classification model; a confidence map generator configured to generate a confidence map having a size the same as that of the padding image and including a confidence value on the basis of the object classification result; and an object information acquirer configured to acquire information on an object in the padding image on the basis of the confidence map.

An area of the padding image except the original image may be set to an arbitrary pixel value.

The original image may be positioned at the center of the padding image.

The partial image acquirer may extract an area included in a window having a predetermined size as a partial image of the padding image while moving the window within the padding image.

The window may have a size the same as that of the original image.

The confidence map generator may determine a confidence value of an area corresponding to each of the plurality of partial images within the confidence map on the basis of the object classification result.

When an object is detected from a specific partial image among the plurality of partial images according to the object classification result, the confidence map generator may increase the confidence value of an area corresponding to the specific partial image within the confidence map.

The object information may include size and position information of each of one or more objects included in the padding image.

The object information acquirer may generate a binary image corresponding to the confidence map on the basis of the confidence value included in the confidence map.

The object information acquirer may acquire the object information by analyzing a connected component between pixels within the binary image.

In another general aspect, there is provided a method for extracting object information including: generating a padding image including an original image; acquiring a plurality of partial images of the padding image; acquiring an object classification result for each of the plurality of partial images using an object classification model; generating a confidence map having a size the same as that of the padding image and including a confidence value on the basis of the object classification result; and acquiring information on an object in the padding image on the basis of the confidence map.

An area of the padding image except the original image may be set to an arbitrary pixel value.

The original image may be positioned at the center of the padding image.

The acquiring of the plurality of partial images may include extracting an area included in a window having a predetermined size as a partial image of the padding image while moving the window within the padding image.

The window may have a size the same as that of the original image.

The generating of the confidence map may include determining a confidence value of an area corresponding to each of the plurality of partial images within the confidence map on the basis of the object classification result.

When an object is detected from a specific partial image among the plurality of partial images according to the object classification result, the generating of the confidence map may include increasing the confidence value of an area corresponding to the specific partial image within the confidence map.

The object information may include size and position information of each of one or more objects included in the padding image.

The acquiring of the object information may include generate a binary image corresponding to the confidence map on the basis of the confidence value included in the confidence map.

The acquiring of the object information may include acquiring the object information by analyzing a connected component between pixels within the binary image.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereafter, specific embodiments of the present invention will be described with reference to the accompanying drawings. The detailed description described below is provided to help comprehensive understanding of the methods, apparatuses and/or systems described in this specification. However, this is only an example, and the present invention is not limited thereto.

In describing the embodiments of the present invention, when it is determined that specific description of known techniques related to the present invention unnecessarily blur the gist of the present invention, the detailed description will be omitted. In addition, the terms described below are terms defined considering the functions of the present invention, and these may vary according to user, operator's intention, custom or the like. Therefore, definitions thereof should be determined on the basis of the full text of the specification. The terms used in the detailed description are only for describing the embodiments of the present invention and should not be restrictive. Unless clearly used otherwise, expressions of singular forms include meanings of plural forms. In the description, expressions such as "include", "provide" and the like are for indicating certain features, numerals, steps, operations, components, some of these, or a combination thereof, and they should not be interpreted to preclude the presence or possibility of one or more other features, numerals, steps, operations, components, some of these, or a combination thereof, other than those described above.

Figure 1:
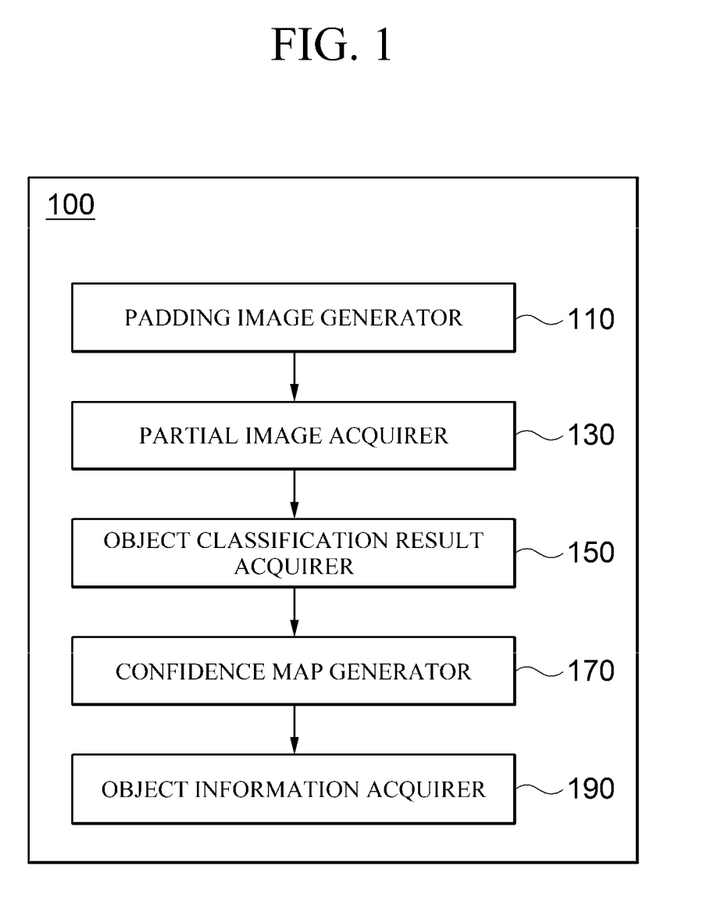
FIG. 1 is a diagram illustrating a configuration of an apparatus for extracting object information.

FIG. 1 is a diagram illustrating a configuration of an apparatus 100 for extracting object information.

Referring to FIG. 1, the apparatus 100 for extracting object information includes a padding image generator 110, a partial image acquirer 130, an object classification result acquirer 150, a confidence map generator 170, and an object information acquirer 190.

The padding image generator 110 generates a padding image including an original image.

The original image may be an image preprocessed through data normalization to classify a specific object included in an image. For example, when an automobile is photographed through a photographing means such as a camera in an automobile production line, an original image may be an image preprocessed to classify a specific object included in the image of the automobile. At this point, the object may mean a defect of a product. For example, when the product is an automobile, the object may include dust, scratches, foreign materials and the like on the outer surface of the automobile.

The padding image means an image including an original image and having a size larger than that of the original image. According to an embodiment, the padding image may be configured of pixels having an arbitrary value in the area except the area of the original image.

Meanwhile, pixels of the area except the original image area in the padding image may have the same value. In addition, although the original image area in the padding image may be positioned at the center of the padding image, the position of the original image area may be changed according to embodiments.

Figure 2:
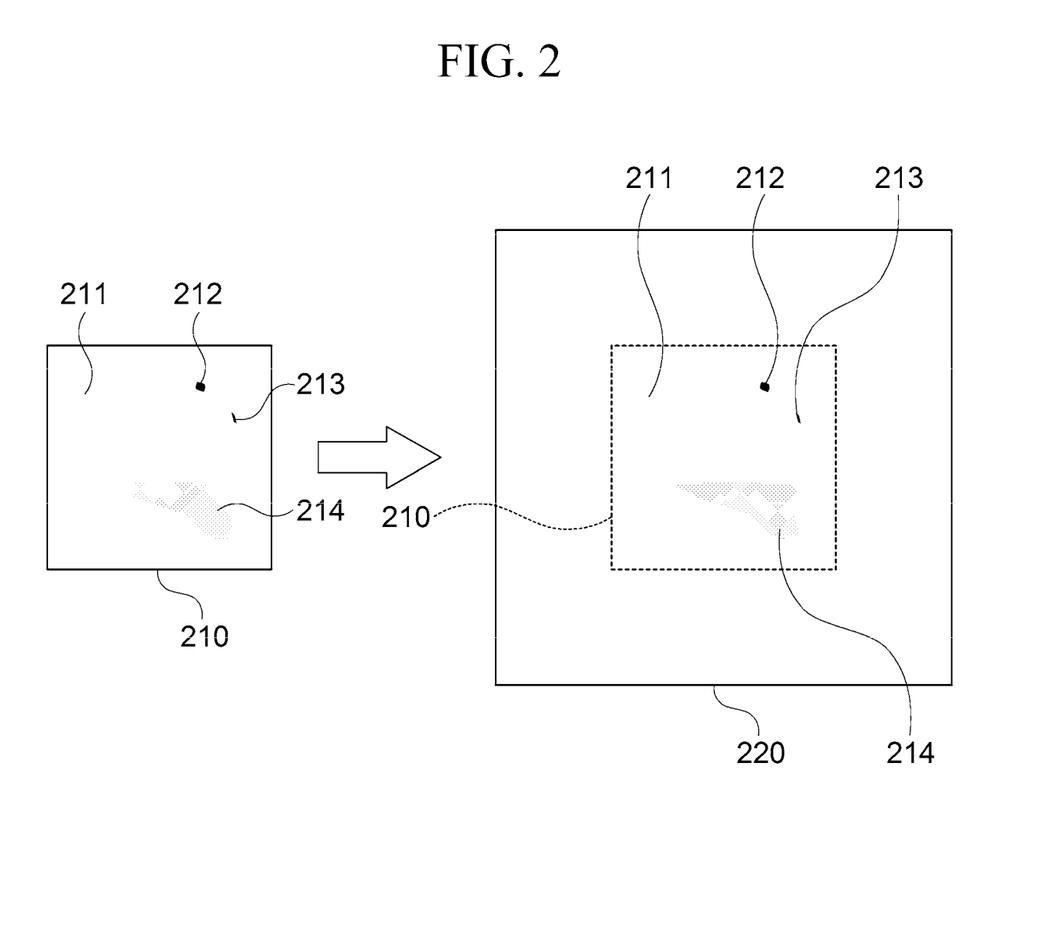
FIG. 2 is a diagram illustrating an example of a padding image according to one embodiment.

FIG. 2 is a diagram illustrating an example of a padding image according to one embodiment.

Referring to FIG. 2, it is assumed that the original image 210 includes an object 211 and a plurality of noises 212, 213 and 214.

At this point, the padding image generator 110 may position the original image 210 at the center and generate a padding image 220 by adding pixels having an arbitrary pixel value in the outer area of the original image 210.

Referring to FIG. 1 again, the partial image acquirer 130 acquires a plurality of partial images of the padding image. At this point, the partial image may mean an image extracting a part of the padding image. In addition, although the partial image may have a size the same as that of the original image, it is not necessarily limited thereto, and the partial image may have various sizes according to embodiments.

According to an embodiment, the partial image acquirer 130 may extract an area included in a window having a predetermined size as a partial image of the padding image while moving the window within the padding image.

Specifically, the partial image acquirer 130 may copy the area of the padding image included in the area of the window which moves according to a preset moving distance, and extract the area as a partial image.

Figure 3:
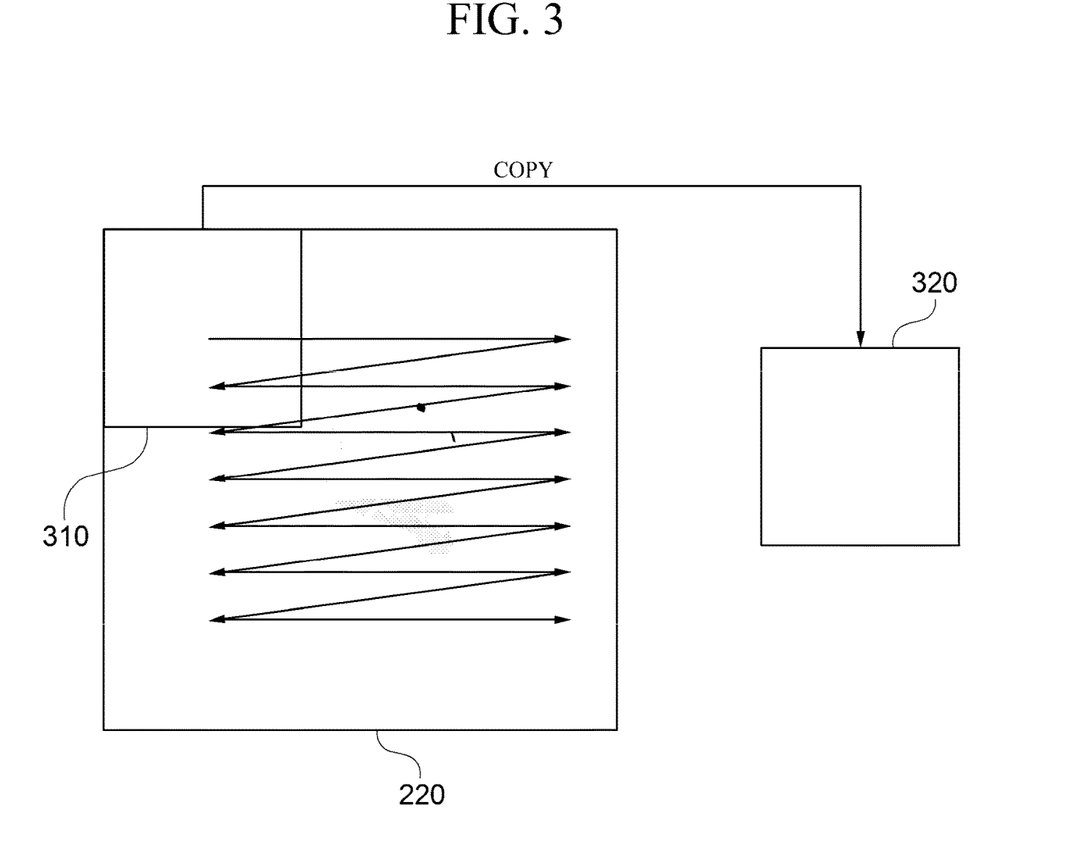
FIG. 3 is a diagram for describing an example in which a partial image is extracted according to one embodiment.

FIG. 3 is a diagram for describing an example in which a partial image is extracted according to one embodiment.

Referring to FIG. 3, after generating a window 310 of a predetermined size, the partial image acquirer 130 may set the top left and the bottom right of the padding image 220 as the start point and the end point of moving the window 310 respectively and move the window 310 from the top left to the bottom right of the padding image 220 in the arrow direction. The partial image acquirer 130 may move the window 310 in the arrow direction as much as a moving distance previously set by the user. At this point, the partial image acquirer 130 may extract a partial image 320 of the padding image 220 by copying an area included in the window 310 moving in the arrow direction.

Meanwhile, the method of moving the window by the partial image acquirer 130 is not limited to the example described above, and the direction of moving the window and the start and end points of moving the window may be set in various ways.

In addition, the moving distance of the window may have various values according to setting of the user. Specifically, when the user sets the moving distance of the window to be short, a lot of partial images of the padding image used for extracting object information may be acquired, and accuracy of extracting object information of the object information extracting apparatus 100 can be enhanced. Contrarily, when the user sets the moving distance of the window to be long, the time consumed for acquiring a plurality of partial images of the padding image is reduced, and the time consumed for extracting object information of the object information extracting apparatus 100 can be reduced.

Figure 4:
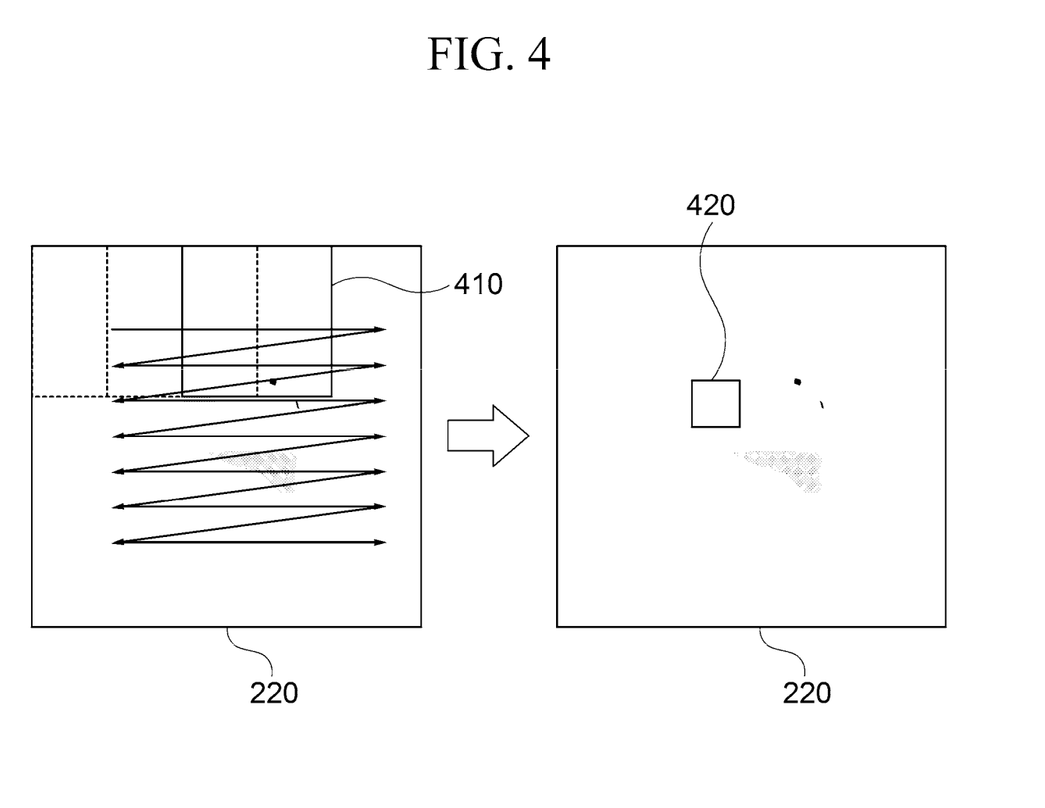
FIGS. 4 and 5 are diagrams for describing another example in which a partial image is extracted according to one embodiment.
Figure 5:
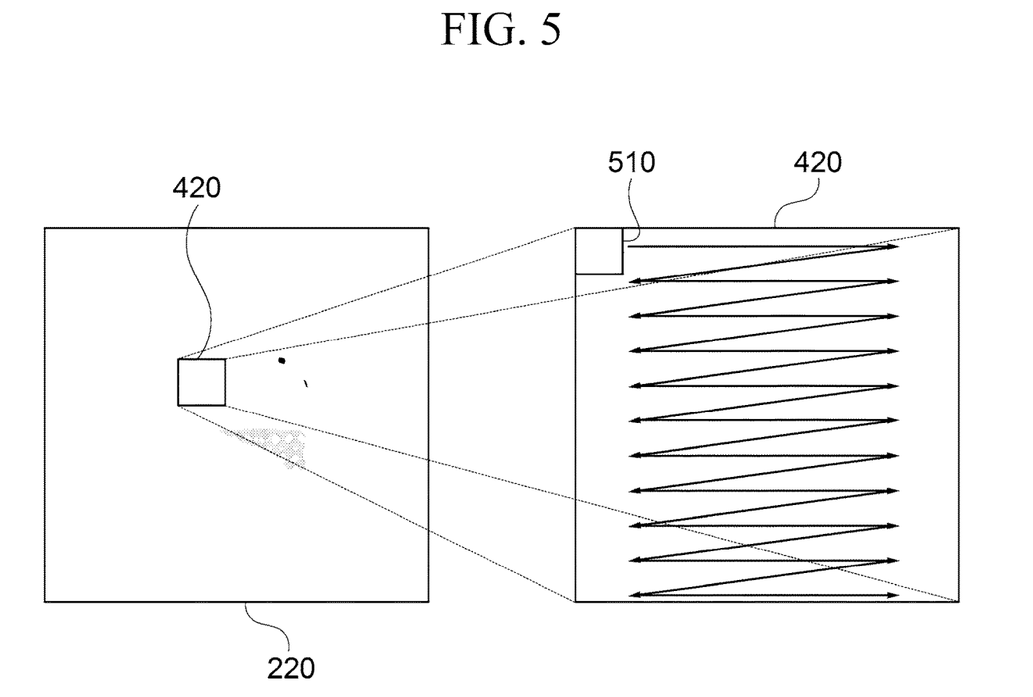

FIGS. 4 and 5 are diagrams for describing another example in which a partial image is extracted according to one embodiment.

Referring to FIGS. 4 and 5, first, the partial image acquirer 130 may generate a window 410 of a large size and detect a candidate area containing an object while moving the window 410 inside the padding image. At this point, the partial image acquirer 130 may detect the candidate area in a speedy way by setting the moving distance of the window 410 to be long.

Then, the partial image acquirer 130 may generate a window 510 of a small size and extract an area included in the window as a partial image of the padding image 220 while moving the generated window 510 within the candidate area 410. At this point, the partial image acquirer 130 may extract a correct position of an object by setting the moving distance of the window 510 to be short.

Referring to FIG. 1 again, the object classification result acquirer 150 acquires an object classification result for each of a plurality of partial images using an object classification model.

At this point, the object classification model may be a deep learning model trained to classify a specific object included in an image using an image collected in advance as a learning data.

Specifically, the object classification result acquirer 150 may acquire an object classification result for each of a plurality of partial images by inputting each of the plurality of partial images of the padding image into the object classification model. At this point, the object classification result acquirer 150 may acquire whether an object is detected from a partial image, information on an object detected from a partial image and the like as an object classification result.

Figure 6:
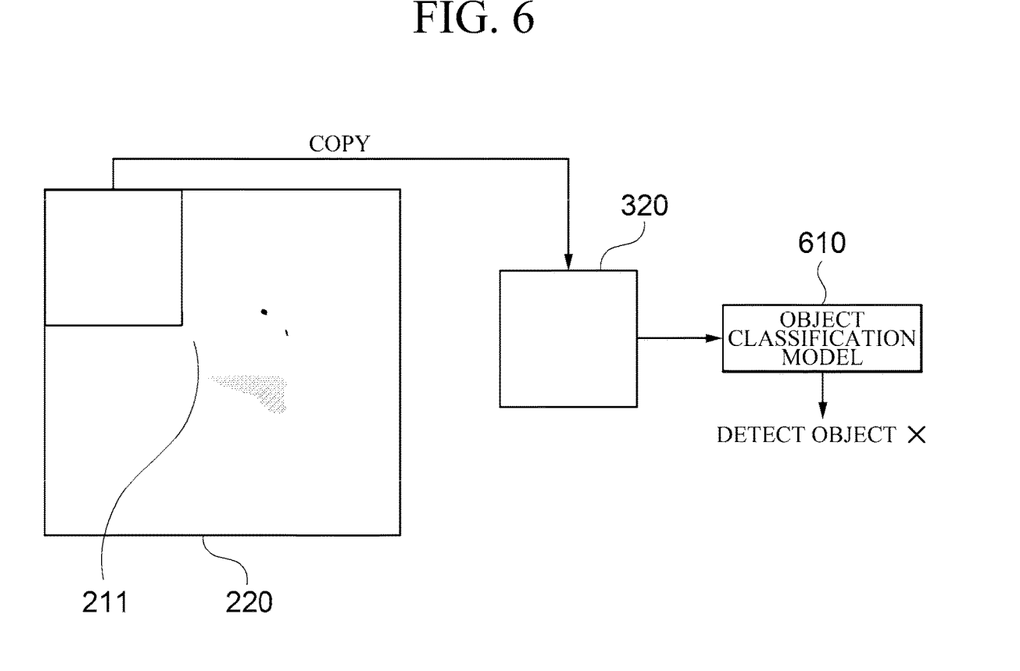
FIG. 6 is a diagram for describing an example in which an object classification result is acquired according to one embodiment.

FIG. 6 is a diagram for describing an example in which an object classification result is acquired according to one embodiment.

In the example shown in FIG. 6, it is assumed that the partial image 320 of the padding image 220 acquired by the partial image acquirer 130 does not include an object 211.

Referring to FIG. 6, the object classification result acquirer 150 may classify an object included in the partial image 320 using an object classification model 610. At this point, since an object is not included in the partial image 320 shown in the figure, the object classification result acquirer 150 may acquire information that an object is not detected from the partial image 320 as an object classification result of the partial image 320.

Figure 7:
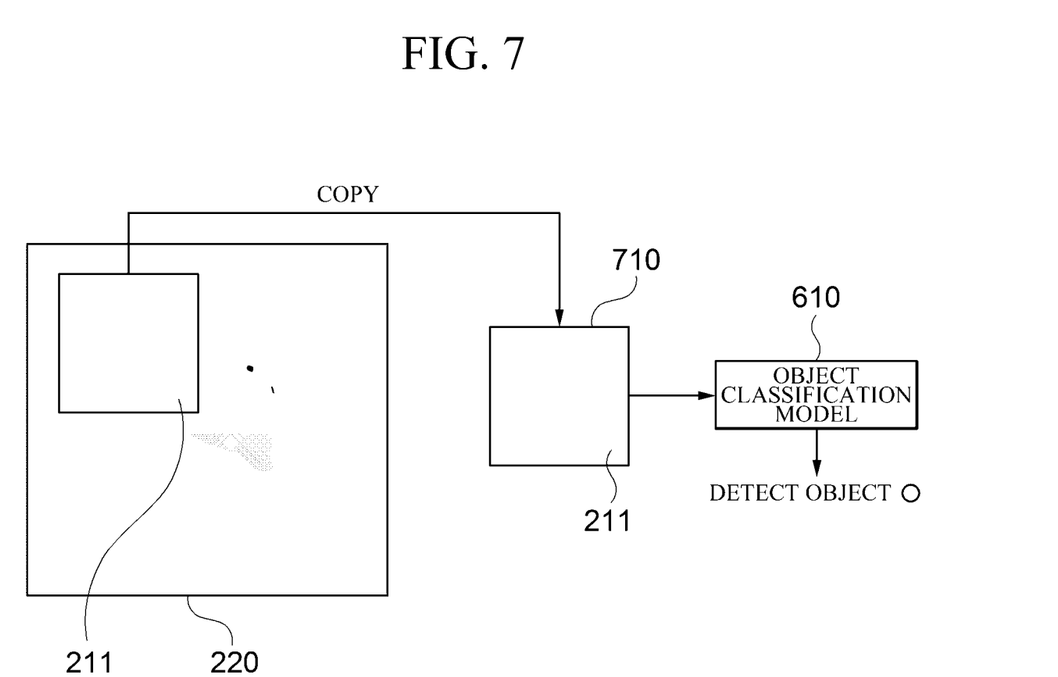
FIG. 7 is a diagram for describing another example in which an object classification result is acquired according to one embodiment.

FIG. 7 is a diagram for describing another example in which an object classification result is acquired according to one embodiment.

In the example shown in FIG. 7, it is assumed that a partial image 710 of the padding image 220 acquired by the partial image acquirer 130 includes an object 211.

Referring to FIG. 7, the object classification result acquirer 150 may classify the object 211 in the partial image 710 using the object classification model 410. At this point, the object classification result acquirer 150 may acquire information that the object 211 is detected from a partial image 510 as an object classification result of the partial image 510.

Referring to FIG. 1 again, the confidence map generator 170 generates a confidence map having a size the same as that of the padding image and including a confidence value on the basis of an object classification result of each of a plurality of partial images.

Specifically, the confidence map generator 170 may generate a confidence map corresponding to a padding image by displaying a confidence value of each pixel configuring the padding image on the basis of an object classification result of each of a plurality of partial images, for example, whether an object is detected from the partial image.

According to an embodiment, the confidence map generator 170 may determine the confidence value of an area corresponding to each of a plurality of partial images within the confidence map on the basis of the object classification result of each of the plurality of partial images.

Specifically, the confidence map generator 170 may determine whether or not to increase the confidence value of an area corresponding to a corresponding partial image within the confidence map according to an object classification result of the partial image, for example, whether or not an object is detected from the partial image.

For example, when an object is detected from a specific partial image among a plurality of partial images according to an object classification result of each of the plurality of partial images, the confidence map generator 170 may increase the confidence value of an area corresponding to the specific partial image within the confidence map.

Figure 8:
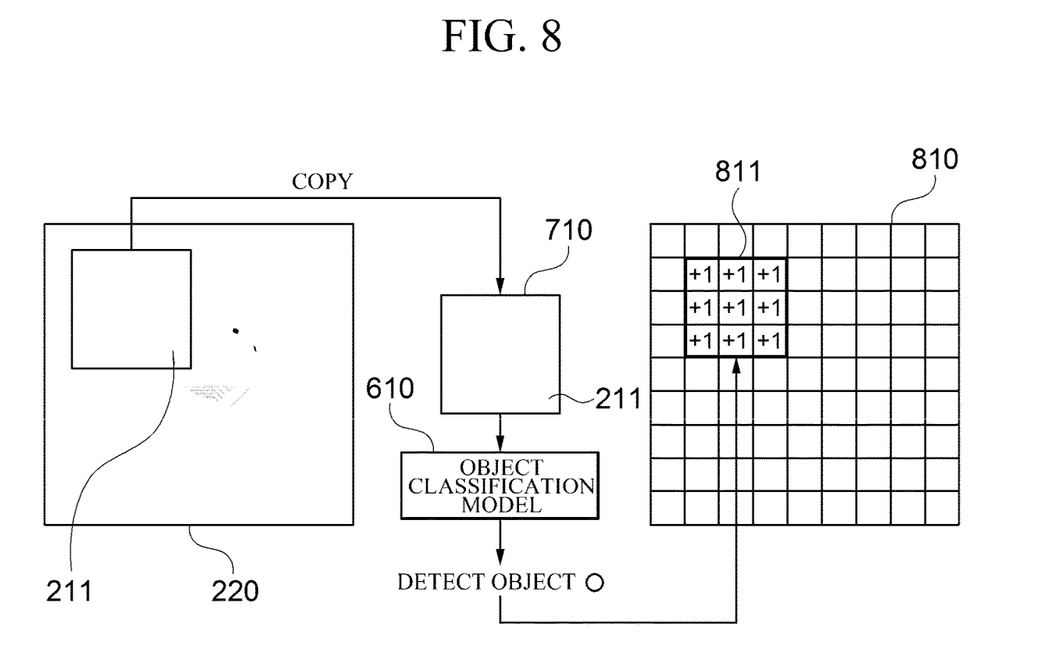
FIG. 8 is a diagram for describing an example in which a confidence value is increased according to one embodiment.

FIG. 8 is a diagram for describing an example in which a confidence value is increased according to one embodiment.

Referring to FIG. 8, it is assumed that the object classification result acquirer 150 detects an object 211 from a partial image 710 of the padding image 220 using an object classification model 610. At this point, the confidence map generator 170 may increase the confidence value of an area 811 corresponding to the partial image 710 in which the object 221 is detected from the confidence map 810.

Meanwhile, although it is shown in FIG. 8 that the increasing numeric value of the confidence value when an object is detected from a partial image is detected is 1, it is not necessarily limited thereto, and the increment of the confidence value may be set diversely according to embodiments.

Referring to FIG. 1 again, the object information acquirer 190 acquires information on an object in the padding image on the basis of the confidence map.

At this point, the object information means information on an object included in the original image. According to an embodiment, the object information may include size and position information of each of one or more objects included in the padding image. For example, the object information may include the size, position and the like of an object.

Specifically, the object information acquirer 190 may acquire information on an object in the padding image using the confidence value included in the confidence map.

According to an embodiment, the object information acquirer 190 may generate a binary image corresponding to the confidence map on the basis of the confidence value included in the confidence map. At this point, the binary image means an image in which every pixel in the image is expressed in either black or white color on the basis of the confidence value.

For example, the object information acquirer 190 may compare the confidence value included in the confidence map with a preset threshold value. At this point, when the confidence value is smaller than the preset threshold value as a result of the comparison, the object information acquirer 190 may set the pixel value of a pixel, which corresponds to an area in which a corresponding confidence value is included in the binary image, to 0. On the other hand, when the confidence value is larger than or equal to the preset threshold value as a result of the comparison, the object information acquirer 190 may set the pixel value of a pixel, which corresponds to an area in which a corresponding confidence value is displayed in the binary image, to 255. The object information acquirer 190 may acquire a binary image corresponding to the confidence map by performing binarization for all areas of the confidence map according to the method described above.

Figure 9:
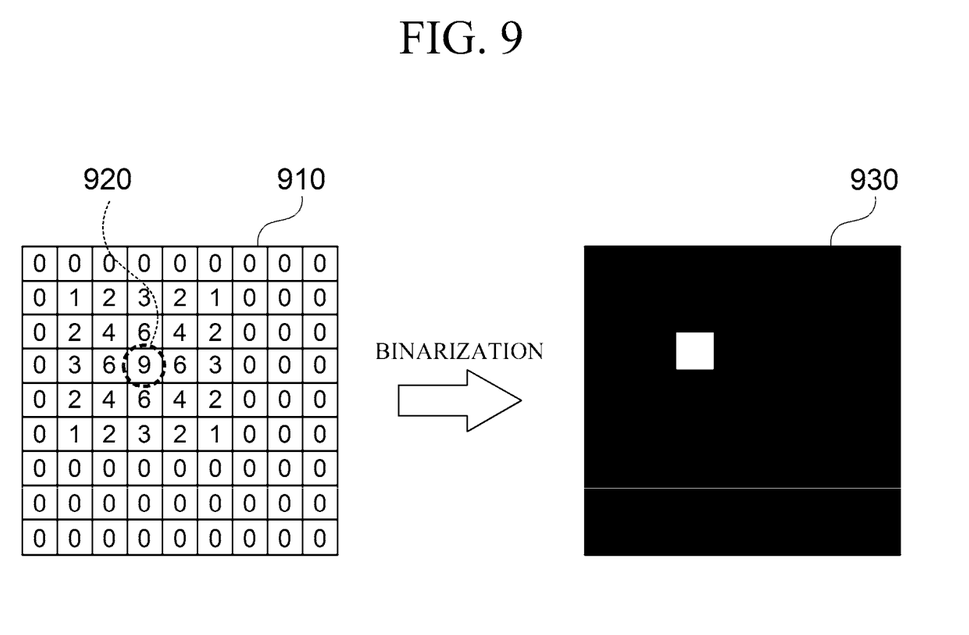
FIG. 9 is a diagram for describing an example in which a binary image is generated according to one embodiment.

FIG. 9 is a diagram for describing an example in which a binary image is generated according to one embodiment.

Referring to FIG. 9, if it is assumed that the preset threshold value is nine to generate a binary image 930, the object information acquirer 190 may determine whether a confidence value included in the confidence map 910 is smaller than nine or larger than or equal to nine. At this point, the object information acquirer 190 may set a pixel in the binary image 930 corresponding to an area 920 having a confidence value equal to the preset threshold value within the confidence map 910 to white color. In addition, the object information acquirer 190 may generate a binary image 930 corresponding to the confidence map 910 by setting the pixels in the binary image 930 corresponding to each of the areas having a confidence value smaller than the preset threshold value within the confidence map 910 to black color.

Figure 10:
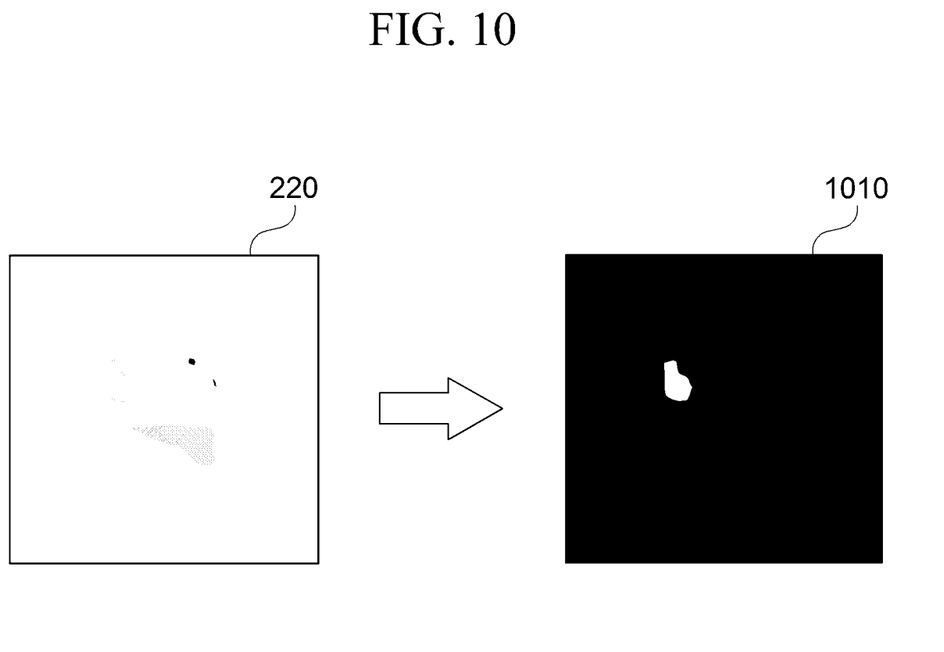
FIG. 10 is a diagram for describing another example in which a binary image is generated according to one embodiment.

FIG. 10 is a diagram for describing another example in which a binary image is generated according to one embodiment.

Referring to FIG. 10, if it is assumed that the padding image 220 is the figure shown on the left side, a binary image 1010 of the confidence map corresponding to the padding image 220 may be generated like the figure shown on the right side.

Referring to FIG. 1 again, the object information acquirer 190 may acquire information on an object in the padding image by analyzing the connected component between pixels within the binary image.

For example, the object information acquirer 190 may acquire information on an object in the padding image from the binary image by using connected component analysis. At this point, when one or more objects are included in the binary image, the connected component analysis may mean an image processing algorithm for acquiring object information for each of one or more objects by labeling a unique number on the pixels included in the same object.

Figure 11:
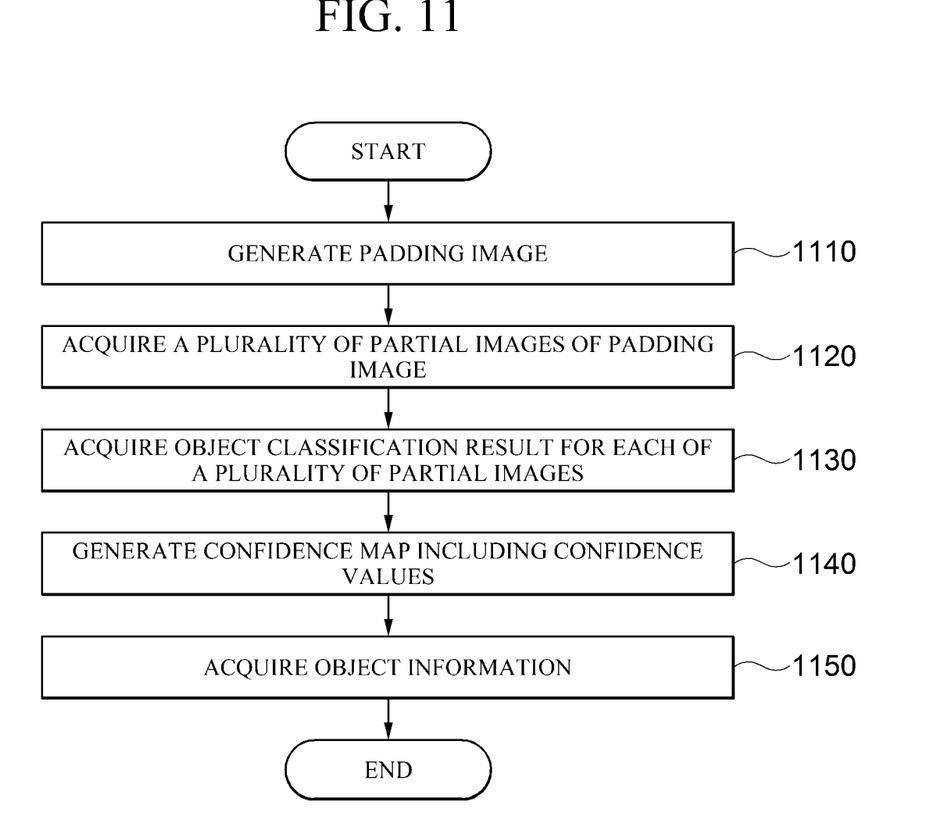
FIG. 11 is a flowchart illustrating a method for extracting object information according to one embodiment.

FIG. 11 is a flowchart illustrating a method for extracting object information according to one embodiment.

The method shown in FIG. 11 may be performs by the apparatus 100 of FIG. 1 to extract object information.

Referring to FIG. 11, the apparatus 100 generates a padding image including an original image (step 1110).

Next, the apparatus 100 acquires a plurality of partial images of the padding image (step 1120).

At this point, the 100 may extract an area included in a window having a predetermined size as a partial image of the padding image while moving the window within the padding image.

Next, the 100 acquires an object classification result for each of a plurality of partial images using an object classification model (step 1130).

Then, the apparatus 100 generates a confidence map having a size the same as that of the padding image and including a confidence value on the basis of the object classification result (step 1140).

At this point, the 100 may determine the confidence value of an area corresponding to each of a plurality of partial images within the confidence map on the basis of the object classification result.

For example, when an object is detected from a specific partial image among a plurality of partial images according to an object classification result, the apparatus 100 may increase the confidence value of an area corresponding to the specific partial image within the confidence map.

Then, the apparatus 100 acquires information on an object in the padding image on the basis of the confidence map (step 1150).

At this point, the apparatus 100 may generate a binary image corresponding to the confidence map on the basis of the confidence value included in the confidence map.

In addition, the apparatus 100 may acquire the object information by analyzing the connected component between pixels within the binary image.

Meanwhile, although the method shown in the flowchart of FIG. 11 is divided into a plurality of steps, at least some of the steps may be performed in a different order or in combination and together with the other steps, omitted, divided into detailed steps, or performed in accompany with one or more steps not shown in the figure.

Figure 12:
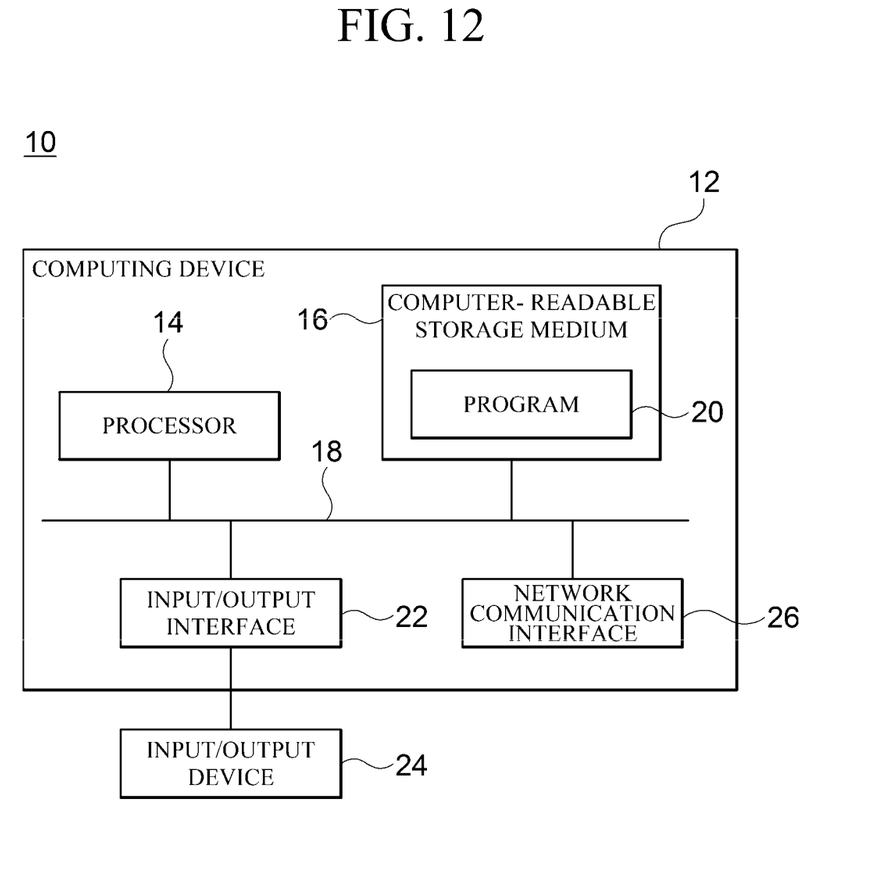
FIG. 12 is a block diagram for describing a computing environment including a computing device suitable to be used in exemplary embodiments.

FIG. 12 is a block diagram for describing a computing environment including a computing device suitable to be used in exemplary embodiments. In the embodiment shown in the figure, each of the components may have a different function and ability in addition to those described below and may include additional components other than those described below.

The computing environment 10 shown in the figure includes a computing device 12. In an embodiment, the computing device 12 may be, for example, one or more components included in the apparatus 100 for extracting object information, such as the padding image generator 110, the partial image acquirer 130, the object classification result acquirer 150, the confidence map generator 170 and the object information acquirer 190 shown in FIG. 1.

The computing device 12 includes at least a processor 14, a computer-readable storage medium 16, and a communication bus 18. The processor 14 may direct the computing device 12 to operate according to the exemplary embodiments described above. For example, the processor 14 may execute one or more programs stored in the computer-readable storage medium 16. The one or more programs may include one or more computer executable commands, and the computer executable commands may be configured to direct the computing device 12 to perform operations according to the exemplary embodiments when the commands are executed by the processor 14.

The computer-readable storage medium 16 is configured to store computer-executable commands or program codes, program data and/or information of other appropriate forms. The programs 20 stored in the computer-readable storage medium 16 include a set of commands that can be executed by the processor 14. In an embodiment, the computer-readable storage medium 16 may be memory (volatile memory such as random access memory, non-volatile memory, or an appropriate combination of these), one or more magnetic disk storage devices, optical disk storage devices, flash memory devices, other forms of storage media that can be accessed by the computing device 12 and is capable of storing desired information, or an appropriate combination of these.

The communication bus 18 interconnects various different components of the computing device 12, including the processor 14 and the computer-readable storage medium 16.

The computing device 12 may also include one or more input and output interfaces 22 and one or more network communication interfaces 26, which provide an interface for one or more input and output devices 24. The input and output interfaces 22 and the network communication interfaces 26 are connected to the communication bus 18. The input and output devices 24 may be connected to other components of the computing device 12 through the input and output interfaces 22. Exemplary input and output devices 24 may include an input device such as a pointing device (a mouse, a track pad, etc.), a keyboard, a touch input device (a touch pad, a touch screen, etc.), a voice or sound input device, various kinds of sensor devices and/or photographing devices, and/or output devices such as a display device, a printer, a speaker and/or a network card. The exemplary input and output devices 24 may be included inside the computing device 12 as a component configuring the computing device 12 or may be connected to the computing device 12 as a separate apparatus distinguished from the computing device 12.

Table 1 is a table comparing performance between the apparatus 100 for extracting object information and a conventional model.

TABLE 1

| | model | | |
|---|---|---|---|
| Function | Object classification model | Object detection model | apparatus for extracting object information(100) |
| Object classification function | ○ | ○ | ○ |
| Object position information | X | ○ | ○ |

TABLE 1-continued

| | model | | |
|---|---|---|---|
| Function | Object classification model | Object detection model | apparatus for extracting object information(100) |
| acquisition function Object segmentation information acquisition function | X | ○ | ○ |
| Learning difficulty of model | Low | High | Low |
| Necessity of developing model | Non-applicable | New development | None (Reuse) |
| Necessity of adding annotations | Non-applicable | Needed | Needless |
| Difficulty of adding annotations | Relatively easy | Difficult | None (Reuse) |

First, the image classification model, which is a conventional technique, does not have an object detection function, i.e., may not acquire location and segmentation information of an object. In addition, the image classification model may classify only a whole image and may not classify in the case of a composite object. Contrarily, the apparatus 100 for extracting object information may acquire the location and segmentation information of an object without additional learning for object detection. In addition, the apparatus 100 for extracting object information may classify every object even in the case of a composite object.

Next, the object detection model, which is a conventional technique, additionally needs information on an object included in a training image to perform learning. Specifically, since a user himself or herself should input information on the object by adding an annotation to the training image, the object detection model is complicated to learn and takes a long time. Contrarily, the apparatus 100 for extracting object information does not need to retrain a previously trained image classification model and may perform an object detection function using a data inputted into an existing model without a work of separately adding an annotation to the data.

Accordingly, the apparatus 100 for extracting object information has a simple model structure, is easy to implement the model, and has excellent object classification and detection performance compared with conventional models.

According to the disclosed embodiments, as a position of a specific object included in an object is extracted using an image classification model having excellent object classification performance, accuracy of classifying an object and extracting a position of the object can be enhanced, and the time and cost consumed for collecting training data including position information can be saved.

The technical features have been described above focusing on the embodiments. However, the disclosed embodiments should be considered from the descriptive viewpoint, not the restrictive viewpoint, and the scope of the present invention is defined by the claims, not by the description described above, and all the differences within the equivalent scope should be interpreted as being included in the scope of the present invention.

What is claimed is:
1. An apparatus for extracting object information, comprising at least one hardware processor configured to implement:
a padding image generator configured to generate a padding image including an original image;

a partial image acquirer configured to acquire a plurality of partial images of the padding image;

an object classification result acquirer configured to acquire an object classification result for each of the plurality of partial images using an object classification model;

a confidence map generator configured to generate a confidence map having a size the same as that of the padding image and including a confidence value on the basis of the object classification result; and an object information acquirer configured to acquire information on an object in the padding image on the basis of the confidence map, wherein the confidence map generator further configured to determine a confidence value of an area corresponding to each of the plurality of partial images within the confidence map on the basis of the object classification result, wherein when an object is detected from a specific partial image among the plurality of partial images according to the object classification result, the confidence map generator further configured to increase the confidence value of an area corresponding to the specific partial image within the confidence map.

2. The apparatus according to claim 1, wherein an area of the padding image except the original image is set to an arbitrary pixel value.

3. The apparatus according to claim 2, wherein the original image is positioned at the center of the padding image.

4. The apparatus according to claim 1, wherein the partial image acquirer further configured to extract an area included in a window having a predetermined size as a partial image of the padding image while moving the window within the padding image.

5. The apparatus according to claim 4, wherein the window has a size the same as that of the original image.

6. The apparatus according to claim 1, wherein the object information comprises size and position information of each of one or more objects included in the padding image.

7. The apparatus according to claim 1, wherein the object information acquirer further configured to generate a binary image corresponding to the confidence map on the basis of the confidence value included in the confidence map.

8. The apparatus according to claim 7, wherein the object information acquirer further configured to acquire the object information by analyzing a connected component between pixels within the binary image.

9. A method for extracting object information, comprising:

generating a padding image including an original image;

acquiring a plurality of partial images of the padding image;

acquiring an object classification result for each of the plurality of partial images using an object classification model;

generating a confidence map having a size the same as that of the padding image and including a confidence value on the basis of the object classification result; and acquiring information on an object in the padding image on the basis of the confidence map, wherein the generating of the confidence map comprises determining a confidence value of an area corresponding to each of the plurality of partial images within the confidence map on the basis of the object classification result, wherein when an object is detected from a specific partial image among the plurality of partial images according to the object classification result, the generating of the confidence map comprises increasing the confidence value of an area corresponding to the specific partial image within the confidence map.

10. The method according to claim 9, wherein an area of the padding image except the original image is set to an arbitrary pixel value.

11. The method according to claim 10, wherein the original image is positioned at the center of the padding image.

12. The method according to claim 9, wherein the acquiring of the plurality of partial images comprises extracting an area included in a window having a predetermined size as a partial image of the padding image while moving the window within the padding image.

13. The method according to claim 12, wherein the window has a size the same as that of the original image.

14. The method according to claim 9, wherein the object information comprises size and position information of each of one or more objects included in the padding image.

15. The method according to claim 9, wherein the acquiring of the object information comprises generating a binary image corresponding to the confidence map on the basis of the confidence value included in the confidence map.

16. The method according to claim 15, wherein the acquiring of the object information comprises acquiring the object information by analyzing a connected component between pixels within the binary image.

\* \* \* \* \*